March 8, 1949.                E. T. JENISON                2,463,694
                              OPTOMETRIST RULE
                            Filed Sept. 21, 1945
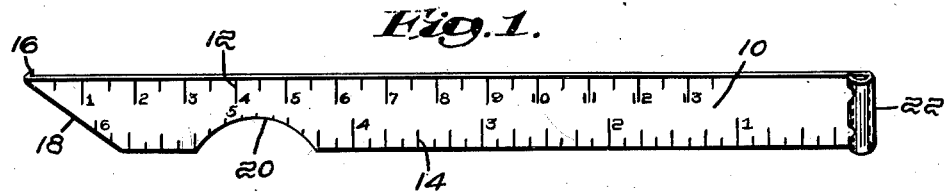
   
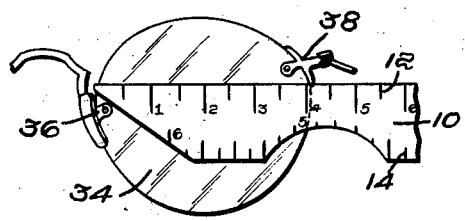
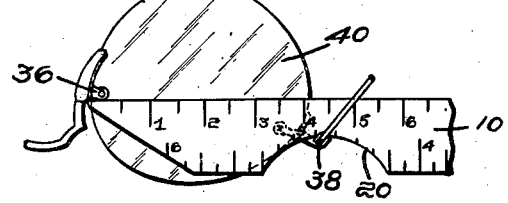
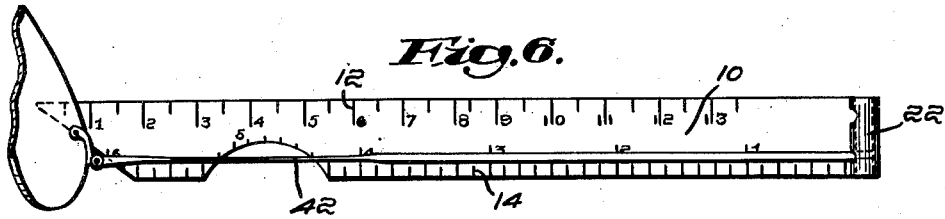
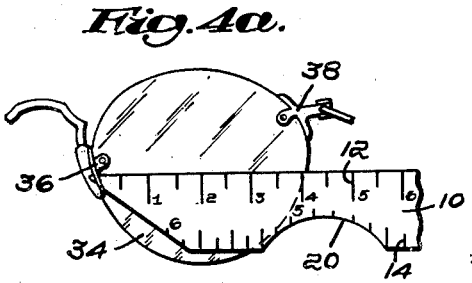
Inventor:
Edward T. Jenison,
by Kenway & Witter
Attorneys Patented Mar. 8, 1949

2,463,694

UNITED STATES PATENT OFFICE 2,463,694

OPTOMETRIST RULE

Edward Talbot Jenison, San Antonio, Tex.

Application September 21, 1945, Serial No. 617,850

2 Claims. (Cl. 33—107)

This invention relates to a new and improved optometrist rule especially constructed for measuring spectacles. The required measurements include the right and left lens diameters, especially at their widest portions, and the temple lengths of the spectacles. Optometrists' rules heretofore provided are of ordinary construction and are not well adapted to take these measurements in the assembled spectacles due to interference with the various frame parts. The primary object of my invention resides in the production of a novel rule especially constructed to avoid such interference and serve these measuring functions conveniently and efficiently.

My improved rule is provided with a hook at one end for engaging the edge of the lens being measured and this end of the rule is cut away at an acute angle from the hook to permit it to engage the lens adjacent to the nose pad. Such construction permits measuring of the right lens without interference with the frame. For measuring the left lens with like facility a portion of the rear edge of the rule adjacent to its hook end is cut away to provide a clearance notch for receiving the adjacent end piece of the frame. The rule is furthermore provided with temple abutment means at the end opposite to the hook and with graduations therefrom along its rear edge for the purpose of measuring temples, all as hereinafter more specifically described.

These and other features of the invention will be best understood and appreciated from the following description of a preferred embodiment thereof selected for purposes of illustration and shown in the accompanying drawing wherein—

Fig. 1 is a front elevation of my improved rule,

Fig. 2 is a fragmentary perspective view of the temple abutment end of the rule, Fig. 3 is a like view of a modified construction, Figs. 4 and 4a illustrate the measuring of a right lens by my rule, Fig. 5 illustrates the measuring of a left lens, and Fig. 6 illustrates the measuring of a temple.

My improved rule can be constructed of metal, plastic or any suitable material. The rule comprises a flat strip 10 having a straight edge 12 along its forward margin and a similar edge 14 along its rear margin. The margin 12 is graduated in centimeters from left to right and the margin 14 is graduated in inches from right to left.

The zero end of the margin 12 terminates in a rearwardly extending hook 16 for engaging the edge of a lens being measured and this end of the rule is cut away at 18 at an acute angle from the hook to permit it to engage a lens adjacent to and without interference with the nose pad or its bracket. The rear margin 14 of the rule is also cut away at 20 to provide a clearance notch for receiving the adjacent end piece of the frame and avoiding interference as hereinafter described.

The rule at the zero end of the margin 14 is rolled onto itself to provide a temple abutment barrel 22. This barrel is perforated at 24 and 26 to receive the ends of temples of different sizes and provide abutment means for such ends. In Fig. 3 I have illustrated a modified construction comprising a rule 28 provided with two barrels 30 and 32 having bores of different sizes to receive temples of different sizes, the temples being adapted to abut against the bottom walls of the barrels.

My improved rule is adapted to take various optometrist measurements with great convenience and efficiency without interference with the frame part of the spectacles and in the accompanying drawing I have, by way of example, illustrated certain of these operations.

In Figs. 4 and 4a is illustrated the measuring of a right lens 34 by my rule. The rule is placed against the rear or concave side of the lens and the hook 16 is engaged with the edge of the lens adjacent to the nose pad bracket 36, either above the bracket as in Fig. 4 or below the bracket as in Fig. 4a. It will be apparent that the rule can then be directed freely across the lens with the scale 12 extending along its greatest diameter without interference with the temple bracket 38, and the diameter measurements can thus be freely and accurately taken.

In Fig. 5 I have illustrated the measuring of a left lens 40. In this case the lens is turned upsidedown with the concave side facing the operator. The hook 16 is engaged with the edge of the lens adjacent to the bracket 36 as illustrated. Disposing of the rule across the lens with its scale 12 extending across the maximum diameter disposes the notch 20 above and in position to receive the temple bracket 38 which, as will be apparent, freely accommodates the bracket and permits free and convenient measuring of such diameter without interference.

In Fig. 6 I have illustrated the use of the rule in measuring the length of temples 42. The end of the temple to be measured is placed against the abutment 22 within one of the openings 24 or 26, or in the barrels 30 or 32, and the temple is then laid straight along the scale 14 and the measurement taken.

Having thus disclosed my invention, what I claim as new and desire to secure by Letters Patent is:

1. An optometrist rule comprising a flat one-piece strip having a straight edge along one longitudinal margin terminating at one end in a hook integral with the strip and extending transversely-rearwardly beyond its rear face, the hook end of the strip terminating in an edge extending from the hook to the other longitudinal margin of the strip and forming an acute angle with said straight edge, the front face of the strip being graduated from zero at said hook along the straight edge.

2. The rule defined in claim 1 in which a portion of the strip at and including a portion of said other margin relatively adjacent to the hook end of the strip is cut away to provide a clearance opening at said other margin.

EDWARD TALBOT JENISON.

REFERENCES CITED

The following references are of record in the file of this patent:

UNITED STATES PATENTS

| Number | Name | Date |
|---|---|---|
| 419,268 | Low | Jan. 14, 1890 |
| 979,768 | Jones | Dec. 27, 1910 |
| 1,044,811 | Paquette | Nov. 19, 1912 |
| 1,463,375 | Shields | July 31, 1923 |
| 2,326,030 | Heavn | Aug. 3, 1943 |
| 2,354,737 | Brown | Aug. 1, 1944 |